| (12) | United States Patent | (10) Patent No.: | US 11,287,189 B2 |
|---|---|---|---|
| | Loznak et al. | (45) Date of Patent: | Mar. 29, 2022 |

(54) INDUCTION HEATING LINE BILLET PUSHOUT SYSTEM AND METHOD WITH JOINTED PUSH ROD ASSEMBLY

(71) Applicant: Clinton Machine, Inc., Ovid, MI (US)

(72) Inventors: Ted L. Loznak, Saint Johns, MI (US); Thomas Stanley Domagala, Laingsburg, MI (US)

(73) Assignee: CLINTON MACHINE, INC., Ovid, MI (US)

( * ) Notice: Subject to any disclaimer, the term of this patent is extended or adjusted under 35 U.S.C. 154(b) by 357 days.

(21) Appl. No.: 16/381,607

(22) Filed: Apr. 11, 2019

(65) Prior Publication Data

US 2019/0316845 A1    Oct. 17, 2019

Related U.S. Application Data

(60) Provisional application No. 62/656,630, filed on Apr. 12, 2018.

(51) Int. Cl.
*H05B 6/16* (2006.01)
*F27D 11/06* (2006.01)
*F27D 3/04* (2006.01)

(52) U.S. Cl.
CPC ............... *F27D 11/06* (2013.01); *F27D 3/04* (2013.01)

(58) Field of Classification Search
CPC .. F27D 11/06; F27D 3/04; H05B 6/02; H05B 6/06; H05B 6/103
USPC ................................ 219/645, 646, 653, 654
See application file for complete search history.

(56) References Cited

U.S. PATENT DOCUMENTS 9,604,274 B2 *   3/2017   Gariglio ............... C21D 9/0075

FOREIGN PATENT DOCUMENTS

| JP | S58107419 | A |   | 6/1983 |
|---|---|---|---|---|
| JP | 59158984 | A | * | 9/1984 |
| JP | H01287221 | A |   | 11/1989 |
| JP | 2000061574 | A |   | 2/2000 |
| JP | 2001252744 | A |   | 9/2001 |
| JP | 2009076267 | A | * | 4/2009 |
| JP | 2009076267 | A |   | 4/2009 |

OTHER PUBLICATIONS

Valery Rudnev, Don Loveless, Raymond Cook and Micah Black, Handbook of Induction Heating, 2003, pp. 612-625, Marcel Dekker Inc., New York.

* cited by examiner

*Primary Examiner* — Hung D Nguyen
(74) *Attorney, Agent, or Firm* — Philip O. Post

(57) ABSTRACT

A billet pushout system is provided for an electric induction billet heating line with long length revolute jointed pushout rods forming a non-jamming pushout rod assembly that is stored in a linear enclosure connected to an arcuate enclosure that deploys and retracts the pushout rod assembly to and from the electric induction billet heating line.

14 Claims, 11 Drawing Sheets

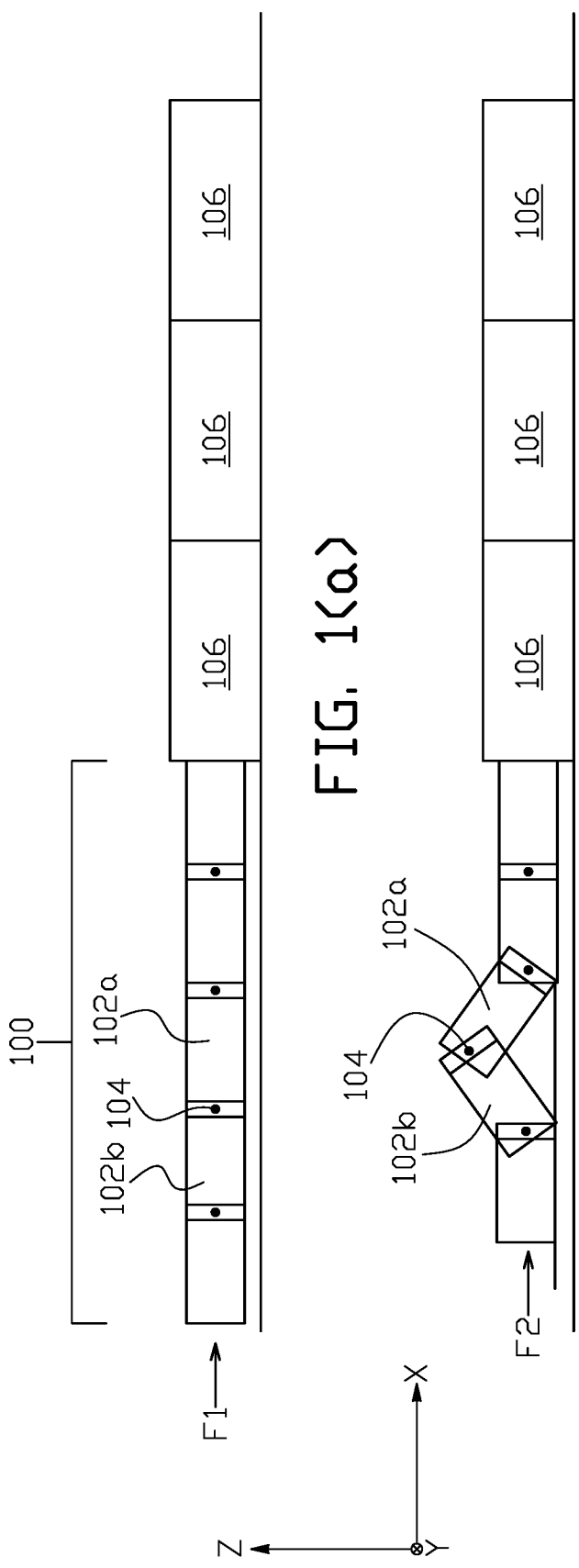

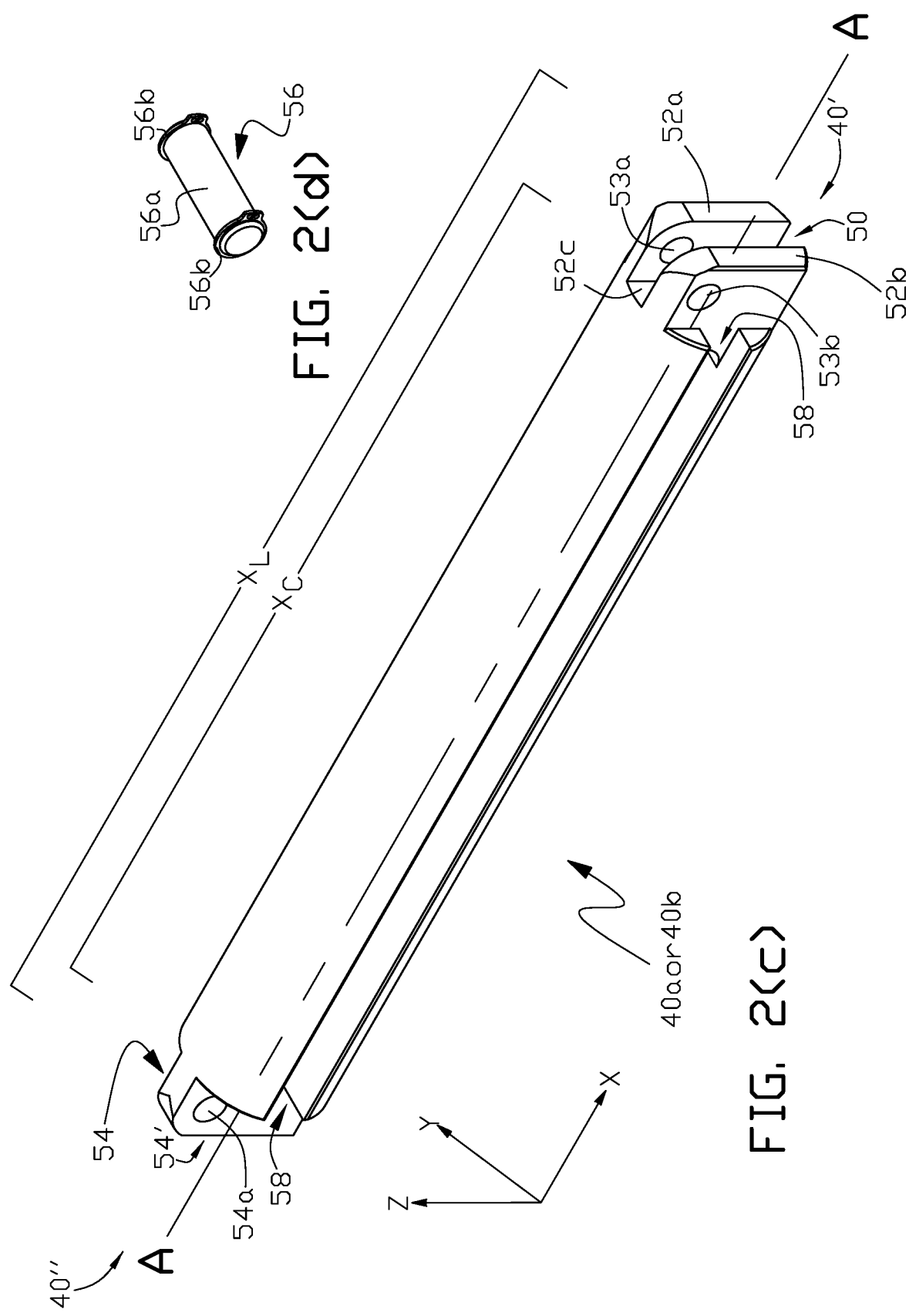

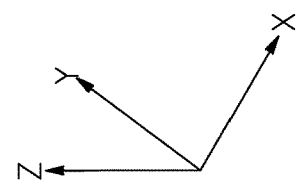
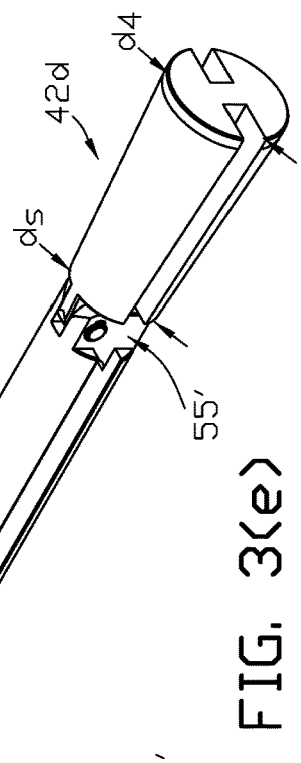
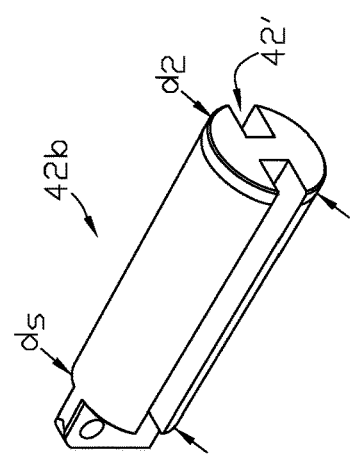
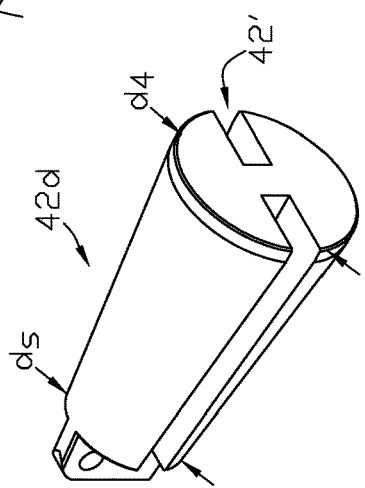
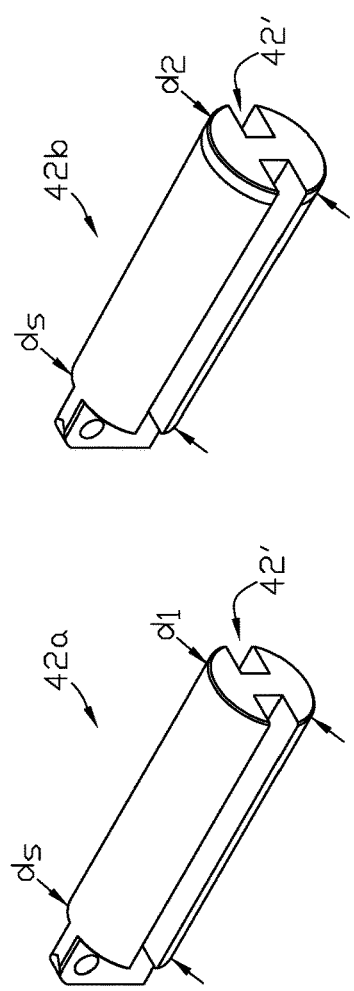
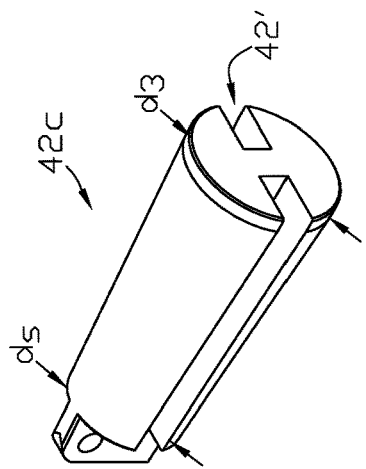

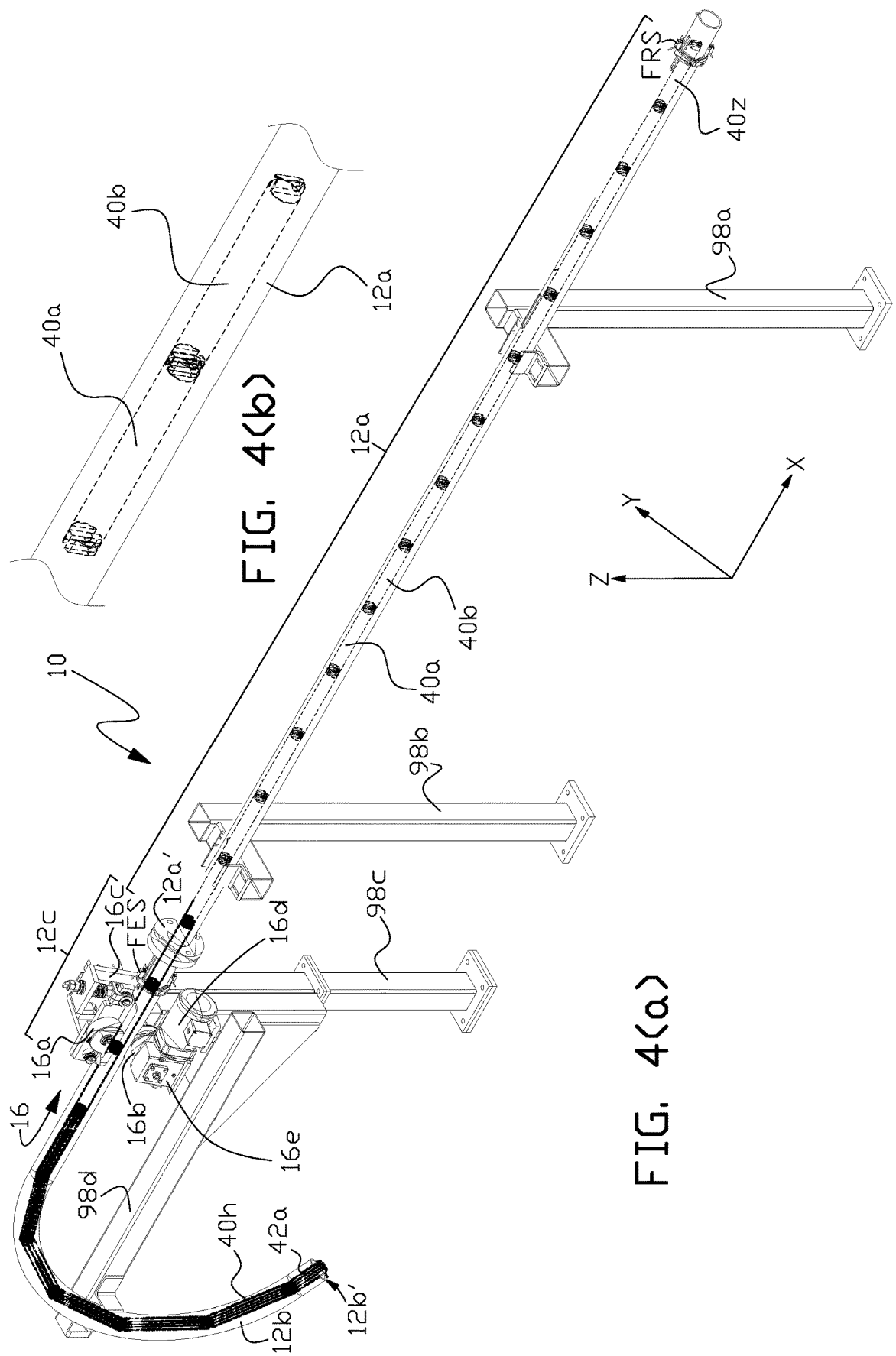

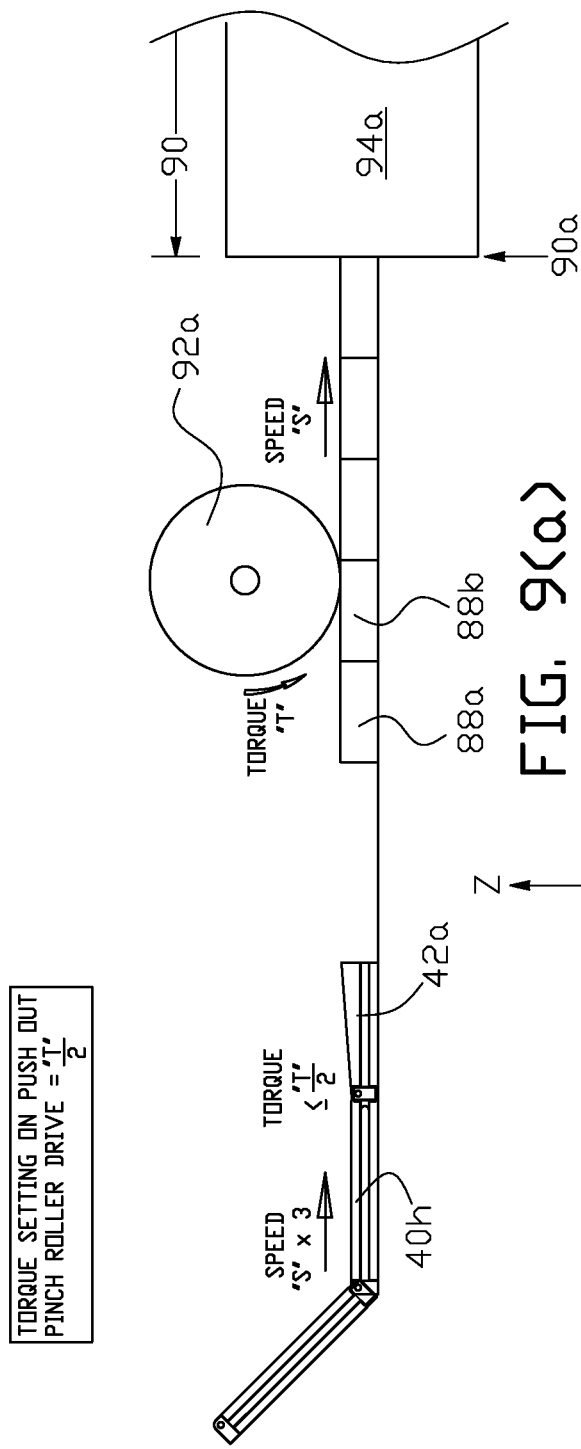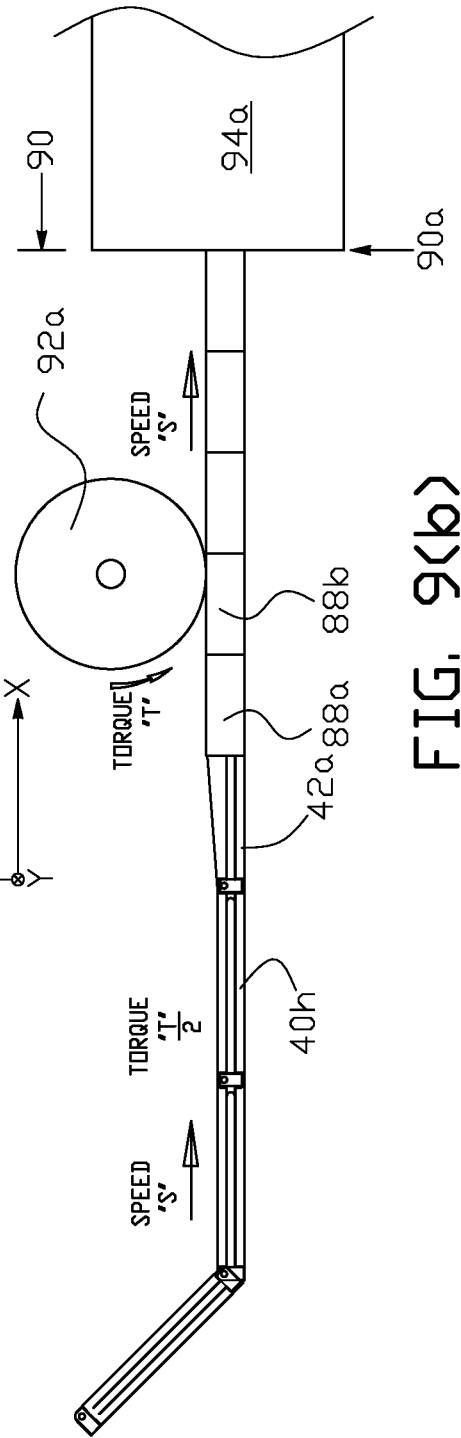

INDUCTION HEATING LINE BILLET PUSHOUT SYSTEM AND METHOD WITH JOINTED PUSH ROD ASSEMBLY

CROSS REFERENCE TO RELATED APPLICATIONS

This application claims the benefit of U.S. Provisional Application No. 62/656,630, filed Apr. 12, 2018, hereby incorporated by reference in its entirety.

FIELD OF THE INVENTION

The present invention generally relates to systems for, and methods of, purging billets from an industrial billet heating process line, such as a heated billet forging line, where billets are electric induction heated prior to forging into articles, and in particular to such systems and methods where a multiple jointed pushout rod assembly is used.

BACKGROUND OF THE INVENTION

In U.S. Pat. No. 9,604,274 a reciprocating pushout rod rack is used to sequentially deposit and remove at least two pushout rods used to abut and clear downstream billets in an induction heating line. A pushout rod advance device is used to interlink independent, sequential pushout rods positioned on the billet track in the heating line without a revolute joint between adjacent pushout rods in the assembly. On clearing of the billets, the individual pushout rods making up the pushout rod assembly are retracted; removed one at a time from the billet track; and stored on the pushout rod rack for future use. In this type of pushout rod assembly, the pushout rods are interlinked when placed on the billet conveyance line without a revolute joint linking the pushout rods together that necessitates use of a complex electromechanical pushout rod rack susceptible to multiple point failures.

It is also known in the art of billet pushers to coil for storage and spool out jointed pushout rod assemblies on storage reels. The requirement for coiling and spooling on a reel limits the longitudinal length of each pushout rod connected together by a revolute joint as required to support small radius winding of the joined pushout rods making up the pushout rod assembly when coiling and spooling on a reel. The required short length of the individual pushout rods making up the interconnected pushout rod link assembly limits the magnitude of billet push force since high magnitude billet push force with short length pushout rod links results in increased possibilities of buckling (jamming) between adjacent pushout rods at the revolute joint in known joined pushout rod assemblies. For example, an unspooled joined pushout rod assembly 100 show in FIG. 1(*a*) including short length pushout rods 102*a* and 102*b* joined by revolute joint 104 can operate satisfactorily at low billet pushout rod assembly force F1 for moving three billets 106 in the heating line whereas application of a sufficiently greater billet pushout rod assembly force F2 in FIG. 1(*b*) will lead to buckling between short length pushout rods 102*a* and 102*b*. The ability of the pushout rod assembly to apply higher magnitude billet pushout rod assembly forces without failure would make the billet pushout system more robust depending upon the heating line requirements, for example, the required range in the number and size of billets to be pushed through a particular electric induction heating line. Further the repetitive coiling/spooling and uncoiling/unspooling of the jointed pushout rods in the pushout rod assembly shortens the service life of the revolute joints between the short length pushout rods due to stress failure of the joints.

It is one object of the present invention to provide a revolute jointed pushout rod assembly from long length pushout rods that also allows linear storage for a majority of the jointed pushout rods in the assembly.

It is another object of the present invention to provide a revolute jointed pushout rod assembly that allows the pushout rods in the assembly to flex in one direction that allows the assembly to arcuately feed out from linear storage and retract from the billet movement track in an induction heating line to linear storage during non-use.

It is another object of the present invention to provide an electromagnetically non-conductive long length pushout rod that reduces eddy current heating of the pushout rod when in the presence of an electromagnetic field generated by an inductor in the induction heating line.

It is another object of the present invention to provide an electric induction heating line billet pushout system and method that uses a revolute jointed pushout rod assembly to purge billets from an industrial billet heating process line.

BRIEF SUMMARY OF THE INVENTION

In one aspect the present invention is a jointed billet pushout system used in an electric induction billet induction heating line to push one or more billets in a series of billets through the heating line.

In another aspect the present invention is a jointed billet pushout rod assembly comprising a series of long length jointed linear pushout rods with reduced susceptibility to buckling during a billet pushout process.

In another aspect the present invention is a long length linear pushout rod for use in a jointed billet pushout rod assembly.

In another aspect the present invention is an induction heating line billet pushout system and method that uses a revolute jointed pushout rod assembly to purge billets from an industrial billet heating process line.

The above and other aspects of the invention are further set forth in this specification and the appended claims.

BRIEF DESCRIPTION OF THE DRAWINGS

The appended drawings, as briefly summarized below, are provided for exemplary understanding of the invention, and do not limit the invention as further set forth in this specification.

FIG. 1(*a*) and FIG. 1(*b*) illustrate a prior art jointed pushout rod assembly formed from short length pushout rods so that the jointed pushout rod assembly can be wound and unwound from a storage spool and the susceptibility of such jointed pushout rod assemblies to buckling upon application of high billet push forces.

FIG. 2(*b*) illustrates limited range of pivot motion in the revolute joint between the two adjacent pushout rods in FIG. 2(*a*) to avoid buckling of the joined pushout rods upon application of high billet push forces.

FIG. 3(a) through FIG. 3(d) illustrate alternative examples of nose adaptors that can be used as the leading (head) pushout rod in a jointed pushout rod assembly of the present invention to facilitate smooth transitional movement of the pushout rod assembly through billet pinch rolls if used in the electric induction heating line, and also to distribute billet push force evenly across the trailing end surface area of the billets being pushed when the cross sectional dimensions of the batch of billets being heated changes.

FIG. 3(e) illustrates one example of the nose adaptor illustrated in FIG. 3(d) joined to a leading end of one example of a pushout rod shown in FIG. 2(c) that can be used for all other pushout rods in a pushout rod assembly.

FIG. 4(a) illustrates one example of a billet pushout system of the present invention where the jointed pushout rod assembly is shown in a stored position and FIG. 4(b) is an enlarged detail view of two identical pushout rods used in the assembly shown in FIG. 4(a).

FIG. 9(a) and FIG. 9(b) are detail drawings illustrating one method of using a jointed billet pushout rod assembly and billet pushout system of the present invention.

DETAILED DESCRIPTION OF THE INVENTION

Figure 4C:
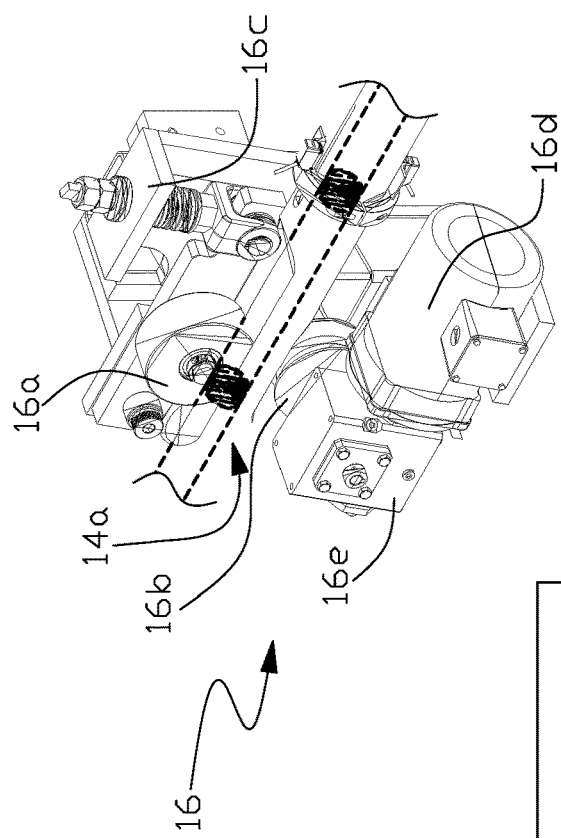
FIG. 4(c) is an enlarged detail view of a pushout rod assembly driver system used in the billet pushout system in FIG. 4(a) for deployment and retraction of the pushout rod assembly.

One embodiment of an electric induction heating line billet pushout system 10 of the present invention is illustrated in FIG. 4(a). In this embodiment the system comprises a pushout rod assembly storage enclosure, a jointed pushout rod assembly and pushout rod assembly driver system 16 (shown in enlarged detail in FIG. 4(c)) that is controlled by a billet pushout process control system.

The jointed pushout rod assembly illustrated in FIG. 4(a) comprises a plurality of serially-connected identical pushout rods with an optional nose adaptor 42a (shown in FIG. 3(a)) forming the leading (head) end of the assembly. In operation of the jointed pushout rod assembly, the leading end of the nose adaptor makes contact with the trailing end surface of the final (last loaded) billet in a batch of billets to be inductively heat treated in an electric induction heating line when the pushout rod assembly is deployed from the storage enclosure.

Figure 2A:
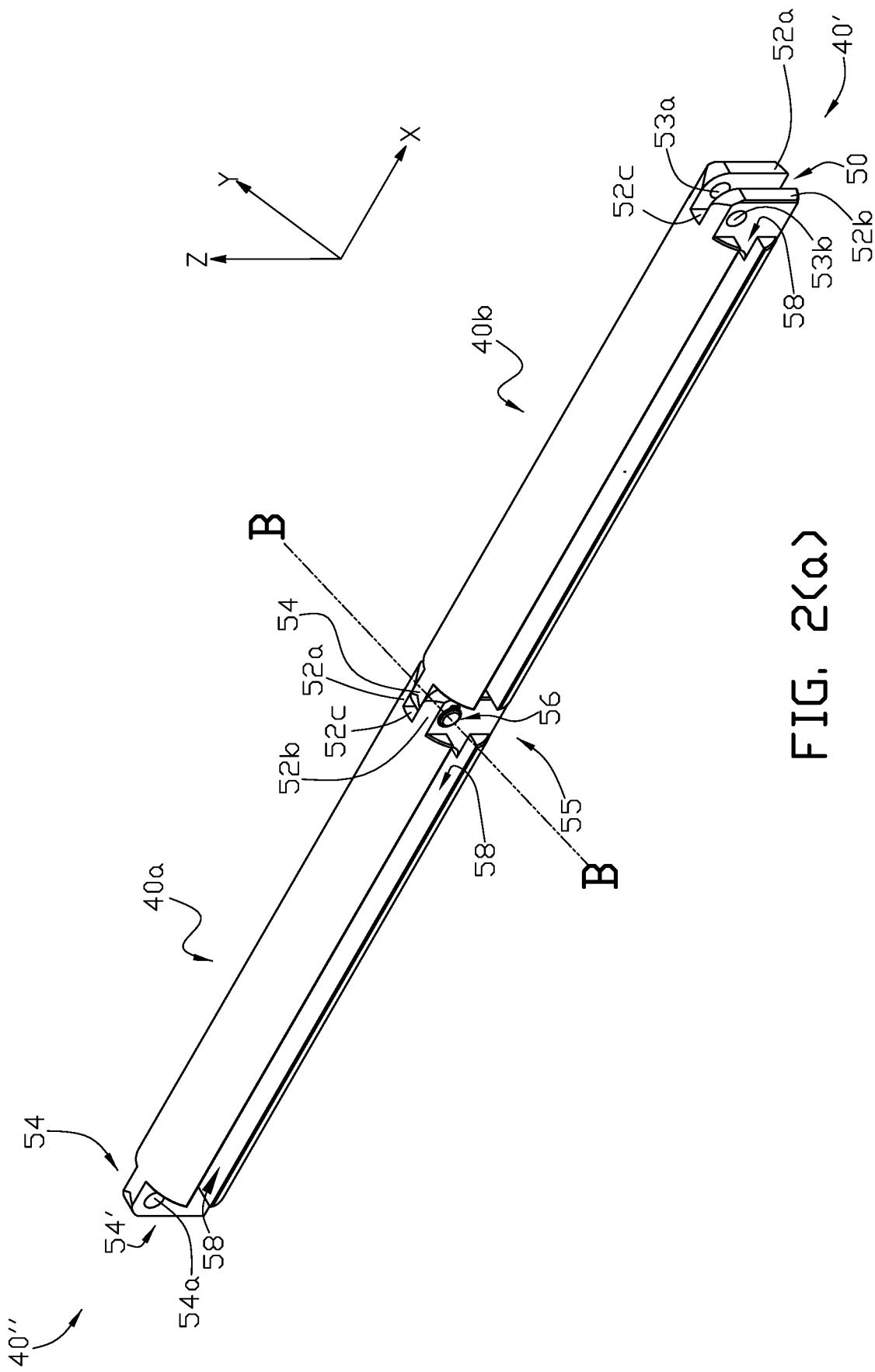
FIG. 2(*a*) is one example of two identical pushout rods of the present invention as joined together to form a section of a revolute jointed pushout rod assembly of the present invention with the pushout rod assembly's overall length determined by the total number of pushout rods joined together and the axial lengths of all joined pushout rods in the assembly.
FIG. 2(c) illustrates one example of complementary opposing end structures of each pushout rod in FIG. 2(a).
FIG. 2(d) illustrates one example of a pivot joint securing element utilized in the jointed pushout rods of the present invention.

One example of a jointed pushout rod of the present invention that can be used for each of the pushout rods in FIG. 4(a) is illustrated in FIG. 2(c) where identical pushout rod are alternatively identified as pushout rod 40a or 40b to distinguish between adjacently joined identical pushout rods. The two identical pushout rods are shown joined together as adjacent pushout rods 40a and 40b in FIG. 2(a). As best seen in FIG. 2(c), pushout rod 40a or 40b is structurally configured at opposing ends 40' and 40" so that pushout rod end 40' of pushout rod 40a can be connected by revolute joint 55 to pushout rod end 40" of adjacent pushout rod 40b as best seen in FIG. 2(a). In FIG. 2(c) the pushout rod has an overall longitudinally-oriented central axial (A) length of $X_L$ composed of a central longitudinally-oriented pushout rod section of length $X_C$ with opposing end sections 40' and 40".

Pushout rod end 40' is referred to as the female pushout rod end, and in this example, is formed from centrally located fork or yoke 50 with side walls 52a and 52b extending axially from the central longitudinally-oriented pushrod section's cross sectional end adjacent to end section 40'. A portion of the central longitudinally-oriented pushrod section's cross sectional end forms interior wall 52c of the yoke. Side walls 52a and 52b have respectively aligned transverse pivot holes 53a and 53b disposed vertically (Z-axis) off-center from the central longitudinal axis A-A (shown in FIG. 2(c)) of the pushout rod.

A three dimensional Cartesian coordinate system is used in the drawings to illustrate vertical direction (Z-axis); transverse direction (Y-axis); and longitudinal direction (X-axis) relative to features of the present invention illustrated in the drawings for understanding the invention while not limiting orientation of the features in the invention.

Pushout rod end 40" is referred to as the male pushout rod end, and in this example, is formed from centrally disposed vertical tongue or tab 54 extending axially from the central longitudinally-oriented pushrod section's cross sectional end adjacent to end section 40" and having transverse pivot hole 54a disposed vertically (Z-axis) off-center from the central longitudinal axis A-A (shown in FIG. 2(c)) of the pushout rod. Tab 54 with transverse hole 54a on a pushout rod (for example pushout rod 40b in FIG. 2(a)) is configured for aligned placement inside yoke 50 of an adjacent pushout rod (for example pushout rod 40a in FIG. 2(a)) so that transverse pivot hole 54a transversely aligns with transverse pivot holes 53a and 53b to allow a revolute pivot joint securing element to pass through the three transverse pivot holes.

Figure 2B:
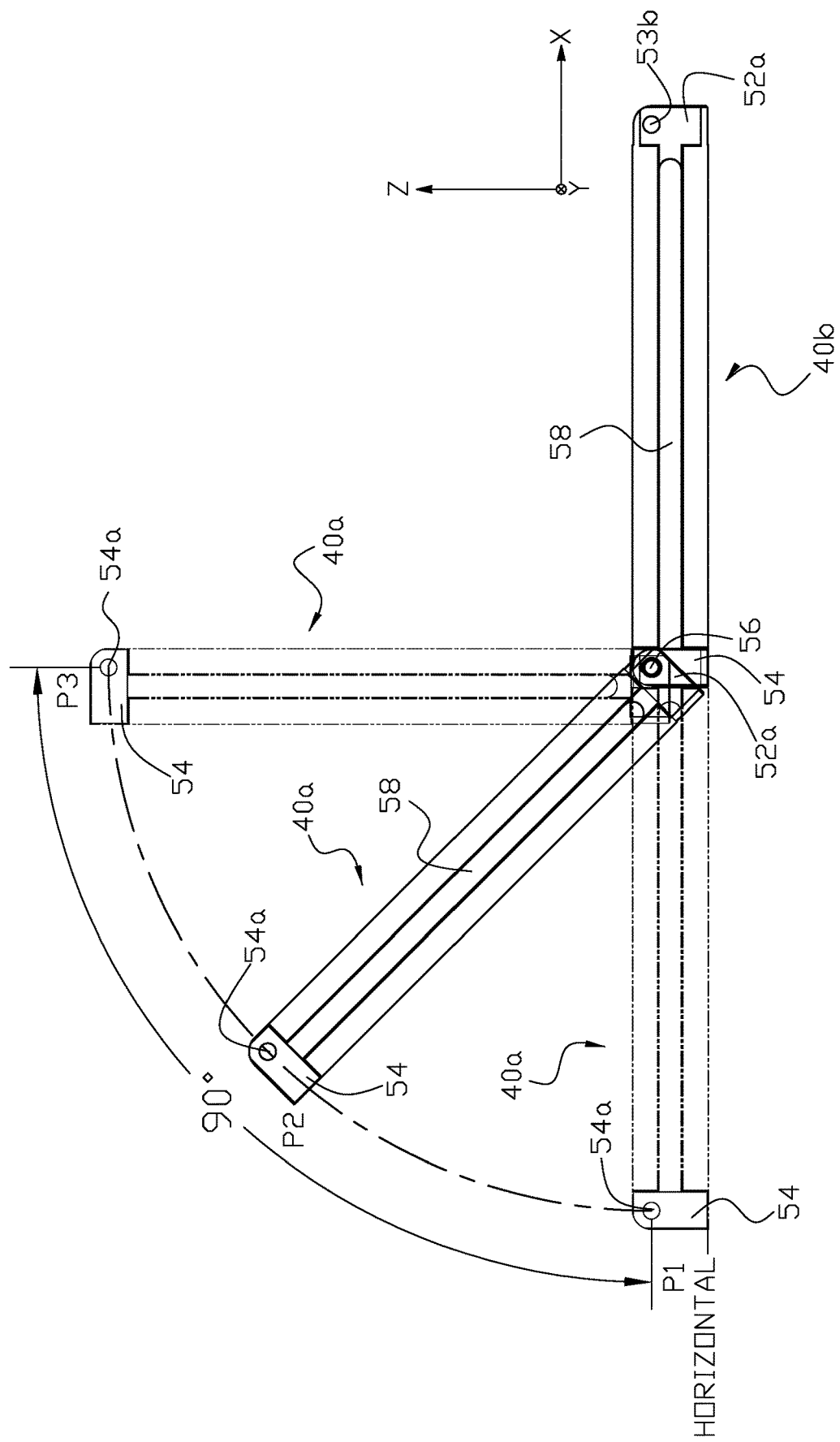

A pivot joint securing element 56 is fixed through aligned transverse pivot holes 53a, 53b and 54a when tab 54 is aligned inside the side walls of yoke 50 as shown in FIG. 2(a) and FIG. 2(b). In FIG. 2(b) single pushout rod 40a is illustrated in three different positions: positions P1 and P3 in broken lines to illustrate opposing limits of rotation of pushout rod 40a and position P2 in solid lines at one location between the limits of rotation. The pivot joint securing element is a fastener that holds tab 54 inside yoke 50 while allowing maximum limited (clockwise for the orientation in FIG. 2(b)) rotation of 90° from horizontal about transverse (Y) axis B-B with this rotation constraint achieved in the vertical off-center pivot direction of an adjacent pushout rod as shown, for example, in FIG. 2(b) between pushout rods 40a and 40b where pushout rod 40b is in a horizontal position. The vertical off-center pivot constrains revolution in a counterclockwise rotation downward from horizontal since the leading end 54' of tab 54 on pushout rod 40b blocks counterclockwise rotation of pushout rod 40a below horizontal position P1 of pushout rod 40a in FIG. 2(b) by contact of the leading end 54' with the interior wall 52c in yoke 50 of the joined adjacent pushout rod (for example, pushout rod 40a in FIG. 2(a)) due to the three transverse pivot holes 53a, 53b and 54a being vertically off-center from the central longitudinal axis of the pushout rod. Therefore in general, transverse revolute joint 55 allows a maximum revolution angle of 90° between adjacent pushout rods in a pushout rod assembly of the present invention to allow deployment or retraction of a pushout rod assembly through arcuate storage section 12b (for example, in FIG. 4(a)) while avoiding buckling of adjacent pushout rods caused by greater unlimited rotation in the assembly when deployed on an electric induction heating line.

In the embodiment of the invention shown in the drawings, pivot joint securing element 56 comprises clevis pin 56a passing through transverse pivot holes 53a, 53b and 54a and secured within the three transverse pivot holes In this example opposing ends of clevis pin 56a has opposing end grooves with retaining snap rings 56b secured in the end grooves to hold the pin in place as shown in FIG. 2(d) with the pivot joint securing element 56 removed from the revolute joint for clarity. In other embodiments the pivot joint securing element may be a pin passing through the pivot holes and secured at opposing ends with suitable fasteners such as cotter pins or a pin with a head at one end and a suitable fastener at the opposing end.

Each pushout rod in a pushout rod assembly of the present invention is formed from a high temperature material as necessary to withstand the environment within an industrial electric induction heating line that it passes through. In one example of the present invention each pushout rod is formed from a suitable stainless steel family and grade. In the embodiment of the invention shown in the drawings the form of each pushout rod is a solid right cylinder except for the opposing ends 40' and 40" which are configured for the interlocking transverse revolute joint with limited rotation achieved by the configuration of the interlocking transverse revolute joint. In other embodiments a pushout rod of the present invention may have other forms, for example, forming the central longitudinally-oriented pushout rod section from a hollow right cylinder or rectangular in cross sectional shape as may be required for a particular application.

In some embodiments of the invention where the pushout rods are formed from electromagnetically conductive materials, one or more of the pushout rods forming the jointed pushout rod assembly have a magnetic field disruptor structurally configured at least in a partial section of the pushout rod, for example, one or more magnetic field disrupting longitudinal grooves 58 as shown in pushout rods 40a and 40b in FIG. 2(a) through FIG. 2(c) to reduce induced eddy current heating in the pushout rods as the pushout rods in the pushout rod assembly pass through an energized electric induction coil utilized in an electric induction heating line.

FIG. 3(a) through FIG. 3(d) illustrate alternative examples of an optional nose adaptor that can be utilized in the present invention. An optional nose adaptor can be joined to the leading end of a pushout rod assembly's leading end pushout rod, for example, as shown in the detail view of FIG. 3(e) where the male end of nose adaptor 42d is joined to the leading female end of leading end pushout rod 40a or 40b. The trailing end of a nose adapter (configured either as male or female end) is formed similar to that for the adjacent pushout rod (configured either as female or male end (respectively) with the revolute joint 55' formed between the nose adaptor and the pushout rod being similar to a revolute joint between adjacent pushout rods in the assembly.

The cross sectional shape and dimensions of the leading end of a nose adaptor can be selected to match, within a tolerance range, the cross sectional shape of the trailing end of the final billet in a billet batch to be heated in the heating line. For example, if the final billet is cylindrical in cross section, and the cross sectional diameter ($d_s$) of the pushout rod 40a or 40b is 1.69 inches, circular surface nose adaptors 42a through 42d may have the following leading end circular surface diameters: for adaptor 42a, a diameter ($d_1$) of 1.69 inches for use with cylindrical billets having a tolerance diameter range within 1.5 to 2.00 inches; for adaptor 42b, a diameter ($d_2$) of 1.88 inches for use with cylindrical billets having a tolerance diameter range of 2.00 to 2.50 inches; a diameter ($d_3$) of 2.41 inches for use with cylindrical billets having a tolerance diameter range of 2.50 to 3.00 inches; and a diameter ($d_4$) of 2.82 inches for use with cylindrical billets having a tolerance diameter range of 3.00 to 3.50 inches. As illustrated in FIG. 3(a) through FIG. 3(e), unlike the constant cross section diameter ($d_s$) of a pushout rod, in one embodiment of the invention, the cross sectional diameter of a nose adaptor linearly decreases from the leading end to the trailing end so that the trailing end at least approximately matches the cross sectional diameter ($d_s$) of the joined pushout rod.

An optional nose adaptor is advantageous when the electric induction heating system provides the means for advancing the batch of billets through the heating line. For example, for the embodiment of the invention shown in FIG. 5 through FIG. 7, the induction heating system's heating line pinch roll driver 92a illustrated in FIG. 9(a) and FIG. 9(b) is installed in enclosure 93 (shown in FIG. 5 to FIG. 7) disposed upstream of the start 90a of heating line 90. In the closed position shown in FIG. 9(a) or FIG. 9(b) the heating line pinch roll driver 92a advances billets into and through the heating line by rotating with pressure applied to the top of the billets in a billet batch. Use of a nose adaptor avoids an abrupt change in cross section between the final billet 88a in the billet batch and a pushout rod in a pushout rod assembly as the pushout rod assembly passes through the heating line pinch roll driver and also assists in spreading the pushing force of the pushout rod assembly across the entire cross section of the trailing end of the final billet in the batch of billets. The use of the nose adaptor obviates the need to change out pushout rods of varying cross sections in the assembly as the cross section of the billets in a batch to be heat treated changes.

The term "downstream" is used herein to describe the positive X-direction in the drawings which includes the direction of billets in the electric induction heating line from start location 90a to end location 90b of the electric induction heating line.

As with the pushout rods of the present invention, a nose adaptor may optionally include one or more magnetic field disruptors such as longitudinally oriented slits 42' in FIG. 3(a) to FIG. 3(d) that extend at least partially along the axial length of the nose adaptor.

In one embodiment of a jointed billet pushout system 10 of the present invention as seen in FIG. 4(a), the pushout rod assembly is assembled from a quantity of twenty-three (23) pushout rods of the present invention joined together with trailing (tail) end final pushout rod 40z and leading (head) end pushout rod 40h with optional nose adaptor 42a joined to the leading end of head pushout rod 40h.

FIG. 4(b) is a detail view of pushout rods 40a and 40b of the present invention in the pushout rod assembly shown in FIG. 4(a). In this example of the invention every jointed pushout rod in the assembly from head pushout rod 40h to tail pushout rod 40z is configured as jointed pushout rod 40a or 40b as illustrated in FIG. 2(a) through FIG. 2(c), and therefore are each alternatively described as a pushout rod in this embodiment of the invention.

In the embodiment of jointed billet pushout system 10 shown in FIG. 4(a) the "ready for use" storage enclosure for the pushout rod assembly comprises a linear storage section 12a and arcuate storage section 12b. In FIG. 4(a) the portion of the linear storage section that connects to the arcuate storage section 12b is designated as driver linear storage subsection 12c as being the preferred, but non-limiting, location of the pushout rod assembly driver system 16 that deploys the pushout rod assembly from the storage enclosure to the electric induction heating line and extracts the pushout rod assembly from the electric induction heating line to the storage enclosure after a billet pushout process has been completed.

The majority of the pushout rods forming the pushout rod assembly are stored in linear storage section 12a of the storage enclosure with a smaller number of pushout rods stored in arcuate storage section 12b that terminates, in this example, with nose adaptor 42a at mouth 12b' of arcuate section 12b. In this example the smaller number of pushout rods stored in the arcuate storage section is determined by the axial lengths of the pushout rods and the configuration of the arcuate storage section to reverse the direction approximately 180 degrees of deployment of the pushout rods in the linear storage section from the direction of pushout rods as indicated by +X and −X arrows in FIG. 7, and in the reverse directions for extraction of the pushout rods from the induction heating line. Alternatively the leading end of the pushout rod assembly may extend partially out of mouth 12b' in a "ready for use" position as long as billets being loaded into the induction heating line prior to deployment of the pushout rod assembly can clear the extended leading end of the assembly.

In a preferred but non-limiting embodiment of the invention, linear storage section 12a is arranged for structural mounting above and (or alternatively) horizontally offset from the electric induction heating line, which facilitates a compact heating line installation particularly when a billet pushout system of the present invention is retrofitted to an existing heating line. Structural mounting of the jointed billet pushout system 10 to the electric induction heating line may be accomplished, for example, with structural supports 98a through 98d as shown in the drawings.

Linear storage section 12a may be optionally formed from interconnected modular linear sections that allow changing the overall length of the stored pushout rod assembly by adding or removing pushout rods from the pushout rod assembly, for example, to accommodate changes in the overall length of the electric induction heating line. For example optional storage flange 12a' (as shown in FIG. 4(a)) can be provided for quick change of the length of linear storage section 12a.

In some embodiments of the invention, linear storage section 12a and arcuate storage section 12b are totally enclosed structures formed, for example, from tubing having a satisfactory inner diameter for storage of the pushout rod assembly.

In the embodiment of the invention shown in the figures, driver linear storage subsection 12c of the linear storage section is at least partially open to allow contact of drive components with the pushout rod assembly in the pushout rod assembly storage enclosure for deployment and extraction of the pushout rod assembly to and from the heating line.

In some embodiments of the invention, linear storage section 12a may have an open upper half section to accommodate removal or addition of pushout rods from or to the jointed pushout rod assembly.

In the example of the invention shown in FIG. 4(a) all of the pushout rods of the present invention have the same longitudinal length $X_L$ although this is not a limiting feature of the invention. In other applications the pushout rods in an assembly may have varying longitudinal lengths of the central longitudinally-oriented pushout rod section as long as the varying longitudinal lengths of the jointed pushout rod assembly permit travel of the required length of the pushout rod assembly through the arcuate storage section 12b as required in a particular application. FIG. 2(a) shows a revolute joint 55 between the joined pushout rods which provides rotation between adjacent pushout rods as required for the pushout rods to pass through the arcuate storage section when being deployed to or extracted from the electric induction heating line while preventing buckling between the pushout rods when they are deployed on the electric induction heating line.

In the embodiment of the invention shown in the drawings, as best seen in the view of FIG. 4(c), pushout rod assembly driver system 16 comprises dual (pair of) pinch rolls formed from upper roll 16a and lower roll 16b that selectively engage and disengage a section 14a (shown in dashed lines) of the pushout rod assembly within the storage enclosure by operation of clutch 16c to transmit reversible rotary power from the output shaft of electric motor 16d via 90-degree gearbox 16e with rotary output to lower roll 16b and/or upper roll 16a via a rotary chain, belt or geared drive (not shown in the figures). Engagement of the pushout rod assembly with the upper and lower pinch rolls rotating in opposite directions (counterclockwise for the upper roll and clockwise for the lower roller in the configuration shown in the drawings) will deploy the pushout rod assembly from the storage enclosure to the heating line for a billet pushout operation while engaged dual pinch rolls rotating in the reverse opposite direction (clockwise for the upper roll and counterclockwise for the lower roll) will extract the pushout rod assembly from the heating line to the storage enclosure after completing a billet pushout operation.

Figure 7:
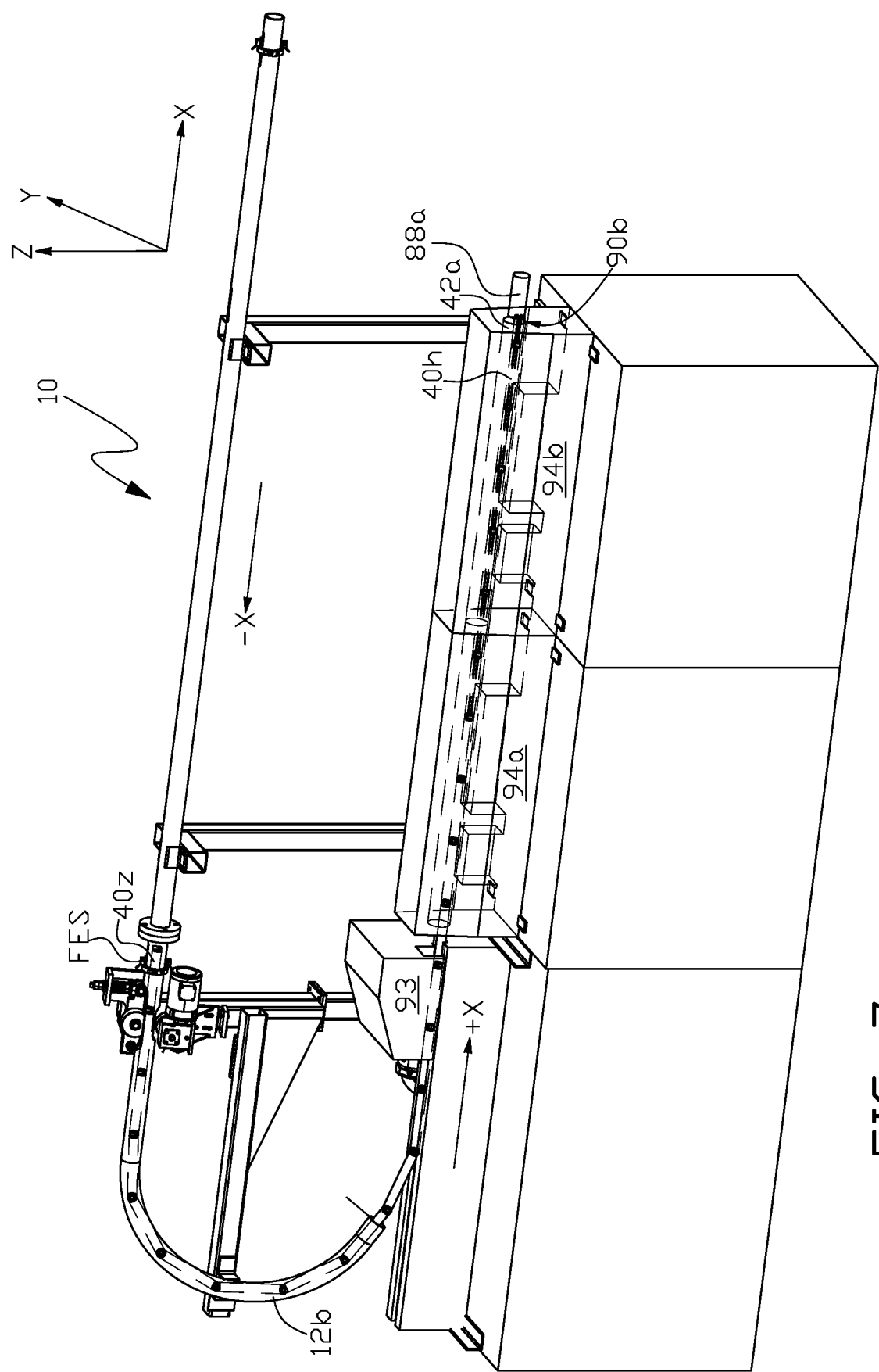
FIG. 7 illustrates the billet pushout system shown in FIG. 5 with the pushout rod assembly in a fully deployed position as the nose adaptor of the assembly pushes the final billet in the batch of billets out of the electric induction heating line.

The pushout rod assembly has at least a sufficient overall longitudinal length so that when deployed to a maximum pushout distance that is determined by the overall length of a particular heating line, the tail end of the pushout rod assembly (pushout rod 40z in the figures) remains under control of the dual pinch rolls for extraction from the heating line as shown in FIG. 7. Full extension sensor (FES) such as a limit switch sensor or photoelectric beam sensor, may optionally be provided to input a signal to the billet pushout control system when the tail end of the pushout rod assembly has reached a full extension position in the storage enclosure.

Figure 5:
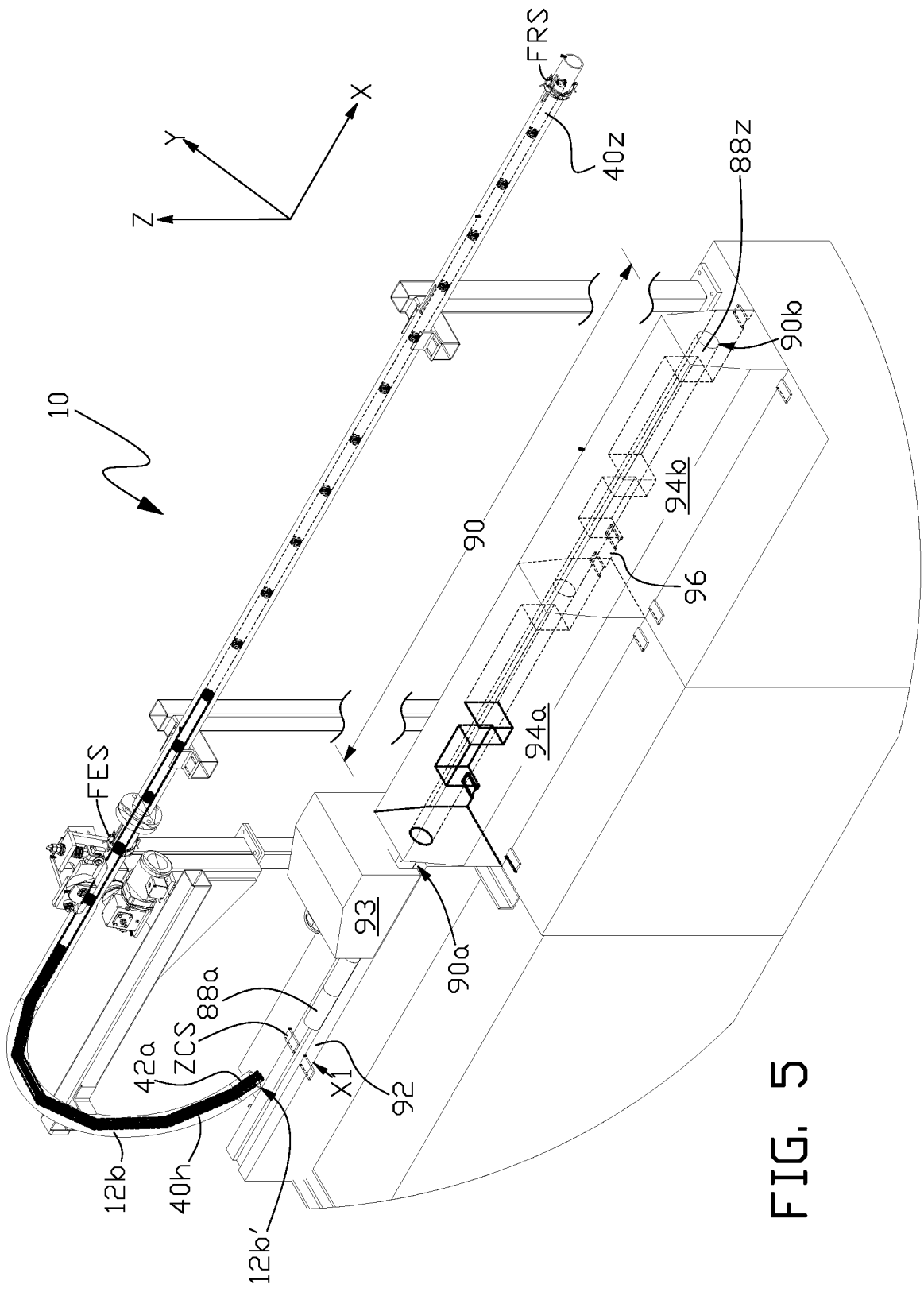
FIG. 5 illustrates one example of the billet pushout system shown in FIG. 4(a) installed in an electric induction heating line with the pushout rod assembly shown in the stored position.
Figure 6:
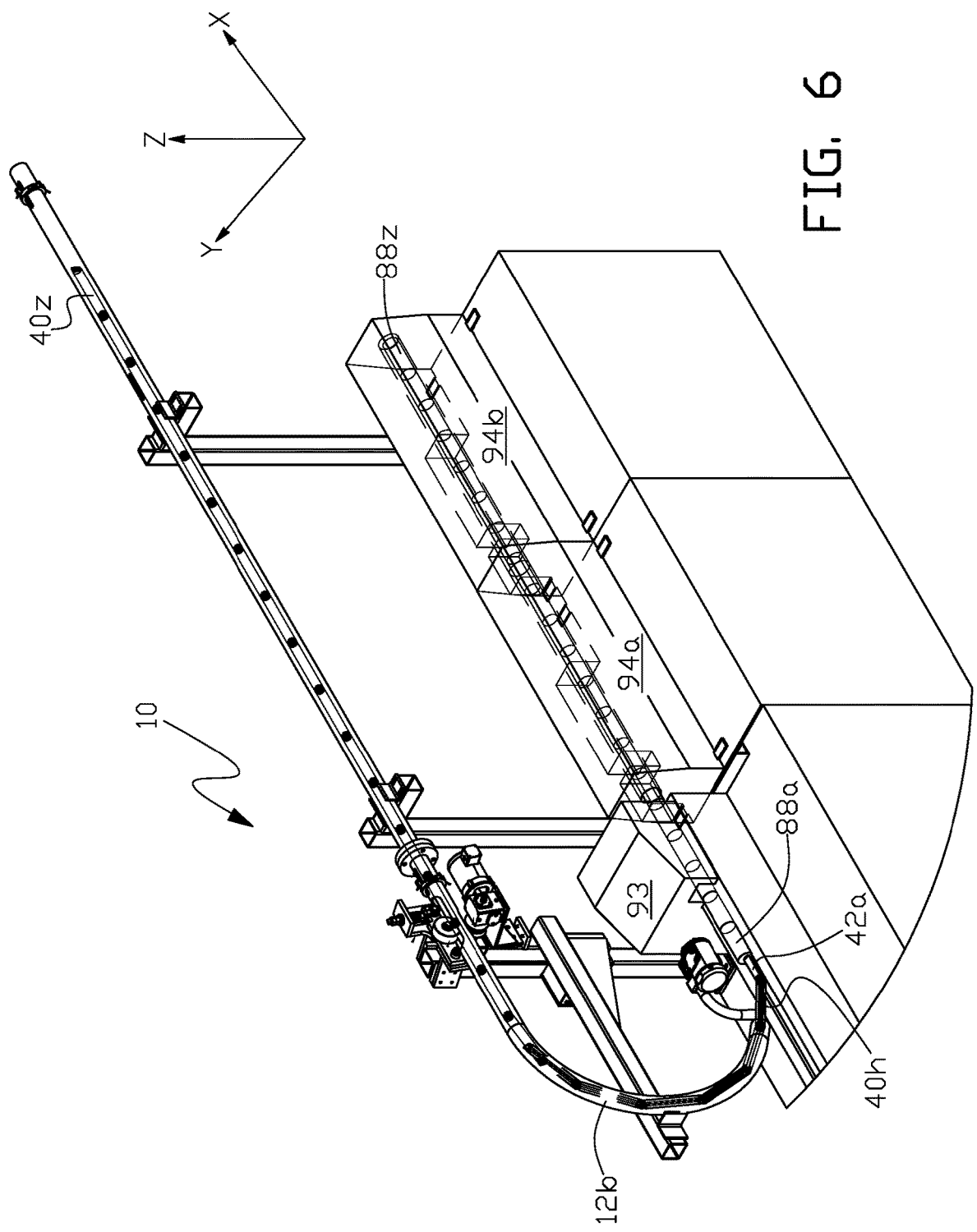
FIG. 6 illustrates the billet pushout system shown in FIG. 5 with the pushout rod assembly in a partially deployed position when the leading end of the nose adaptor of the assembly makes initial contact with the trailing end of the final billet in a batch of billets to be inductively heat treated in the electric induction heating line.

One method of using a billet pushout system of the present invention in an induction heating line 90 is illustrated in FIG. 5 through FIG. 7. In FIG. 5 the pushout rod assembly is shown in the stored position as in FIG. 4(a) with the jointed billet pushout system 10 installed over the heating line. A series of individual billets from first loaded billet 88z to last loaded billet 88a that form a billet batch for induction heating in the electric induction heating line are shown in the process of loading onto the heating line. Billet conveyor 92, which is independent of the billet pushout system, transports the series of billets to pinch roll 92*a* (which is a component in the heating line system) upstream of the start 90*a* of the electric induction heating line. Delivery of billets to the billet conveyor is as known in the art, for example, manual or automatic supply from billet sorter equipment, or transfer from a preheat billet heating line. Billet conveyor 92 may be any billet conveyor as known in the art. The series of back-to-back individual billets being delivered by conveyor 92 pushes the predetermined number of billets in the billet batch to be heated into the pinch roll 92*a* upstream of the enclosed induction heaters 94*a* and 94*b*. The billets move forward on induction heating line rails 96 or other suitable billet support structures known in the art through one or more enclosed electric induction coil(s) that form induction heaters 94*a* and 94*b* of the heating line and are inductively heated to a required temperature profile for further industrial processing at the end 90*b* of the heating line where the inductively heated billets exit the heating line. Two induction heaters, as known in the art, are illustrated as the heating line in the drawings for example only. In the drawings the induction heaters are shown as open box structures to illustrate movement of the billet pushout system of the present invention along the heating line, which are, for example, thermally enclosed induction heating coils that are also referred to as billet induction heating furnaces in the art. The heating line may be in alternative embodiments of the invention a mixed heating line, for example, with mixed enclosed induction and fossil fuel heaters, or enclosed non-heater billet heat soaking regions between enclosed heaters as long as there is a requirement for a billet pushout system of the present invention.

In the embodiment of the invention shown in the drawings, induction heating line pinch driver 92*a* (shown in FIG. 9(*a*) and FIG. 9(*b*)) is installed in enclosure 93 in FIG. 5 through FIG. 7 and advances the billet batch into the heating line.

After the predetermined number of billets are delivered at least to heating line position X1 (in FIG. 5) downstream of the billet pushout system's storage enclosure's mouth 12*b*', pushout rod assembly driver system 16 drives the pushout rod assembly in the storage enclosure out of mouth 12*b*' preferably at an accelerated rate sufficient to catch up with and apply a billet pushout rod force to the trailing end of the last loaded billet 88*a* in the billet batch as shown in FIG. 6. Zone clear sensor (ZCS) such as a photoelectric beam sensor shown in FIG. 5, may optionally be provided to input a signal to the billet pushout control system when the billet conveyor is clear of billets that could interfere with a pushout rod assembly being deployed from the storage enclosure.

The pushout rod assembly continues to maintain positive contact with the trailing end of last loaded billet 88*a* as both the pushout rod assembly and final last loaded billet 88*a* continue advancing at a predetermined rate of speed controlled by pushout rod assembly driver system 16 or a separate heating line billet driver system.

In electric induction heating line systems where the predetermined rate of (line heating) speed of the billets through the enclosed induction heaters is controlled by a separate induction heating line billet driver system, such as heating line pinch driver 92*a*, once the leading end of the pushout rod assembly, which in the present example is nose adaptor 42*a*, transitions downstream in the X-direction under heating line pinch driver 92*a* within enclosure 93, in one embodiment of the present invention, the pushout rod assembly driver system 16 transfers to an electronic slip-clutch mode while the heating line pinch driver 92*a* takes over and continues to drive both the pushout rod assembly and remaining billets at the same rate of speed through the heating line, until all the loaded billets are pushed through to the end 90*b* of the heating line. In this embodiment of the invention the predetermined rate of line heating speed is set by the induction heating line system so that all loaded batch billets exit the heating line with the required billet temperature profile for the industrial process (or other process step) to be performed at the end of the line.

FIG. 7 illustrates the pushout rod assembly fully extended (deployed) in the heating line immediately after the last loaded billet 88*a* in the billet batch has been heated and pushed from the end 90*b* of the heating line. At this point in the process, the heating line pinch driver 92*a* opens up to release movement control of the pushout rod assembly, and pushout rod assembly driver system 16 reverses direction so that the pushout rod assembly retracts back up into storage enclosure preferably at an optimum speed so that the next predetermined load of batch billets can be loaded onto the heating line and the above process for the billet pushout system of the present invention can be repeated with minimal change-over time.

Figure 8:
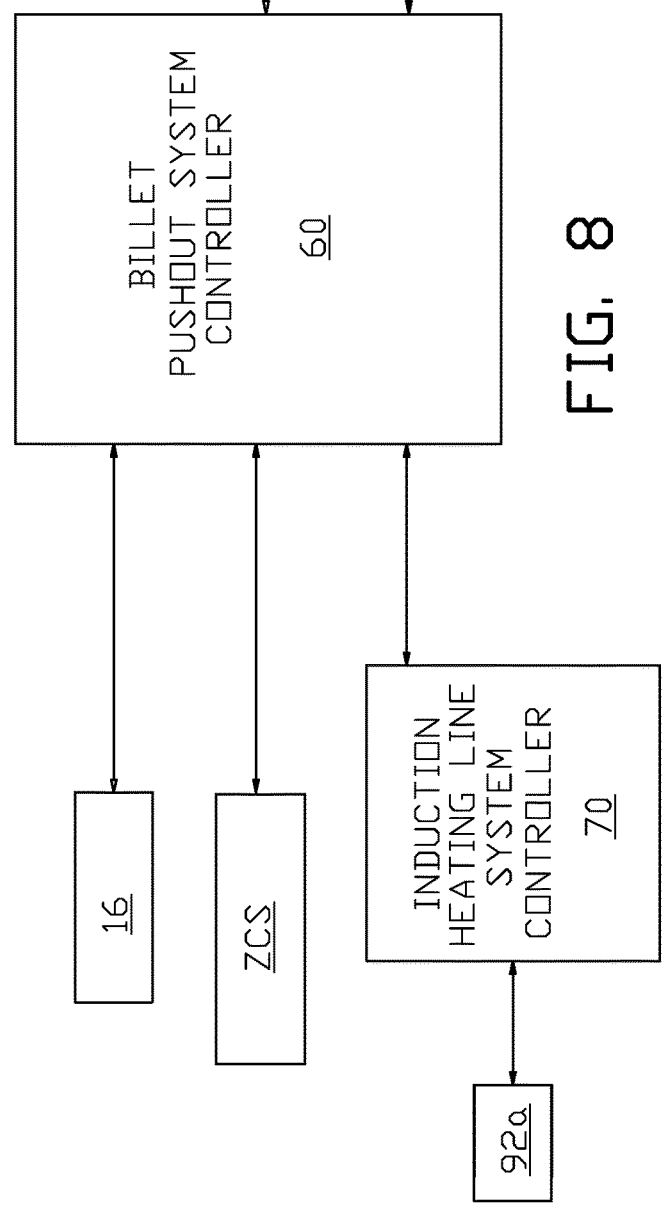
FIG. 8 is a simplified block diagram of one example of a process control system used with a billet pushout system of the present invention.

FIG. 8 illustrates one embodiment of a control system in block diagram form for a jointed billet pushout system of the present invention. In this embodiment, billet pushout system controller 60 comprises a Programmable Logic Controller (PLC) and Control Module suitably located for use by a system operator. After the last loaded billet 88*a* in a billet batch to be heated is loaded into heating line 90 in FIG. 6, billet pushout system controller 60 commands pushout rod assembly driver system 16 to rotate dual upper and lower pinch rolls 16*a* and 16*b* in a direction to extend (deploy) the pushout rod assembly from the mouth 12*b*' of arcuate storage section 12*b* until the leading end of the assembly (nose adaptor 42*a* in this example) contacts the trailing end of the last loaded billet in the billet batch upstream of the heating line pinch roll driver 92*a* located upstream at the entry end of heating line 90. Optional zone clear sensor (ZCS), if used, transmits an inhibit signal to billet pushout system controller 60 to disable deployment of the pushout rod assembly if a billet is sensed on the conveyor line in a position that interferes with the deployment.

In the illustrated embodiment of the invention, the heating line pinch roll driver 92*a* controls movement of the billet batch and pushout rod assembly through the induction heating line. When the leading end of the pushout rod assembly engages last loaded billet 88*a*, billet pushout system controller 60 receives an electrical input signal of an increase in torque based on pre-set parameters, at which time billet pushout system controller 60 executes a signal for the pushout rod assembly driver system 16 to enter a torque monitoring (slip-clutch) mode, in which the pushout rod assembly driver system acts like a slip-clutch, while still applying torque to the pushout rod assembly, relative to the rate of feed being determined by the billet heating line pinch roll driver 92*a*. This process of operation ensures that all loaded billets and the leading end of the pushout rod assembly maintain positive contact with each other as they both transition underneath the heating line pinch roll driver 92*a*. Once the last loaded billet in the billet batch and pushout rod assembly are under the heating line pinch roll driver 92*a*, the heating line pinch roll driver takes over and controls the pre-determined rate of feed for the pushout rod assembly as it moves together with the batch billet through the heating line, and eventually purging all billets in the batch from the induction coil(s) in the heating line.

In the present embodiment of the invention, in the event of a failure in the electric induction heating line system while billets in the billet batch are stranded within the enclosed induction heating line the heating line pinch roll driver can be opened to release the pushout rod assembly and with variations in the pushout rod drive system 16 can resume heating line speed control to push out the stranded billets.

In some embodiments of the invention a pushout rod assembly fully extended sensor (FES) is disposed at a dimensional distance (determined by the length of the heating line) along the length of the linear storage section 12a to detect when a sufficient length of the pushout rod assembly has been paid-out to fully pushout or purge all billets remaining in the heating line length to empty the heating line system. Upon sensing full extension FES sends a fully extended signal to billet pushout system controller 60 which commands the pushout rod drive system 16 to stop payout of the pushout rod assembly from the storage enclosure.

In some embodiments of the invention pushout rod assembly fully retracted sensor (FRS) is disposed at a dimensional distance (determined by the length of the heating line or the length of the linear storage section) along the length of the linear storage section 12a to detect when a sufficient length of the pushout rod assembly has been fully retracted back up into the storage enclosure.

In one embodiment of the invention the pushout rod control system operates in a slip-clutch or Speed Limited Torque Adjustable (SLTA) mode. The SLTA mode regulates the deployment speed of pushout rod assembly driver system 16 based on the magnitude of torque required to maintain a set speed as specified by a billet pushout system operator for a particular application of the billet pushout system. The speed and torque are adjusted using parameters of the pushout rod assembly driver system.

In summary of the below method of pushing out heated billets from an electric induction heating line, a batch of billets for electric induction heating is loaded in the electric induction heating line with the batch of billets terminating in a final batch billet. The electric induction heating line jointed billet pushout rod assembly in a "ready to use" position is deployed from the arcuate storage section of a pushout rod assembly storage with the pushout rod assembly driver system. The deployment speed and torque of the pushout rod assembly driver system is adjusted with the billet pushout system controller responsive to a speed and torque of the induction heating line driver as the head billet pushout rod or head adopter makes contact with the final billet and the electric induction heating line jointed billet pushout rod assembly deploys behind the final billet until the final billet exits the electric induction heating line. At that point in the process the batch billet induction heating has been completed and the electric induction heating line jointed billet pushout rod assembly is retracted into the arcuate storage section of the pushout rod assembly storage to the "ready-to-use" position with the pushout rod assembly driver system.

FIG. 9(a) and FIG. 9(b) illustrate one example of a SLTA mode in a billet pushout process of the present invention. Induction heating line system controller 70 in FIG. 8 is provided with the electric induction heating system in this example which can be separate from the jointed billet pushout system of the present invention. In FIG. 8 the induction heating line system controller 70 transmits pinch driver 92a torque "T" and billet batch speed "S" data to the billet pushout system controller 60 for execution of the SLTA mode described below.

The induction heating line system controller 70 controls the torque "T" of induction heating line pinch driver 92a so that a billet batch speed "S" is achieved as required so that billets in the billet batch proceed through the induction heating line 90 and arrive at end 90b with the required heating profile. In this example of the invention the induction heating line system controller 70 and heating line pinch driver 92a controls the speed of the billet heating line before and after the trailing end of the last loaded billet 88a makes contact with the leading end of the pushout rod assembly, which in this example is the leading end of nose adaptor 42a in FIG. 9(a) and FIG. 9(b).

In FIG. 9(a) before the pushout rod assembly makes contact with the last loaded billet, the pushout rod assembly driver system 16 controls the speed of the payout (deployment) of the pushout rod assembly at, for example as shown in FIG. 9(a) and FIG. 9(b), three times the speed "S" of the billet batch with the dual upper and lower pinch rolls (16a and 16b) being maintained at less than or equal to half the torque "T" of pinch driver 92a so that the pushout rod assembly makes rapid contact with the last loaded billet before it is engaged by pinch driver 92a. When the leading end of nose adaptor makes contact with the trailing end of last loaded billet 88a, the pushout rod assembly driver system 16 sets the torque of the dual upper and lower pinch rolls 16a and 16b at one-half the torque "T" of pinch driver 92a to maintain the speed of the pushout rod assembly at the speed "S" of the billet batch as it advances downstream under the pinch driver 92a. Once the pushout rod assembly is under control of pinch driver 92a pushout rod assembly driver system 16 speed control electronically slips to synchronize with the heating line controller via the pinch driver 92a at torque "T" and speed "S" to ensure that the billet batch continues to move through the induction heating line at the speed required to achieve the required billet heating profile at end 90b of the heating line.

When the leading end of the pushout rod assembly makes contact with the trailing end of the last loaded billet the amount of torque required to push the pushout rod assembly goes up beyond the set point of less than or equal to one-half of the torque "T" of the pinch driver. In order to limit the amount of torque that dual upper and lower pinch rolls 16a and 16b produce, the pushout rod assembly driver system 16 adjusts the output speed of the pushout rod assembly to keep the torque below a set maximum torque set by the billet pushout system operator. As the trailing end of the last loaded billet in the billet batch moves away from the leading end of pushout rod assembly, the torque required to maintain the current speed goes down and thus the pushout rod assembly driver system 16 output speed goes up. The result is, the leading end of the pushout rod assembly stays in contact with the trailing end of the last loaded billet and matches the last loaded billet's feed speed, and maintains the required torque to do so.

The long longitudinal length $(X_L)$ of a pushout rod utilized in a pushout rod assembly of the present invention is limited by the dimensions of the arcuate storage section 12b in a particular application. For example with a pushout rod axial length $(X_L)$ of around 10 inches and a cross sectional diameter of around the arcuate storage section requires a radius of around 22 inches for the arcuate storage section for deployment and retraction of the pushout rod assembly and with a pushout rod axial length $(X_L)$ of around 18 inches requires a radius of around 42 inches for the arcuate storage section for deployment and retraction of the pushout rod assembly. Other embodiments of the invention may utilize pushout rod axial lengths outside of the 10 to 22 inches provided the particular environment of the system can support arcuate radii outside of the approximate range.

In other embodiments of the invention a separate induction heating line billet speed control element such as pinch roller 92*a* is not provided and the pushout rod assembly driver system 16 with variations can control speed of the billet heating through the heating line by pushing force directly on the billet batch to achieve the required billet heating profile.

While the described embodiments of the invention address cylindrical billets other configuration of billets, for example rectangular bars, can be accommodated with appropriate modifications.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. An electric induction heating line billet pushout rod comprising:
    a central longitudinally-oriented pushout rod section having a longitudinally-oriented central cross sectional axis;
    a female pushout rod end section formed at a first opposing longitudinally-oriented cross sectional end of the central longitudinally-oriented pushout rod section, the female pushout rod end section comprising a centrally located yoke extending axially from the first opposing longitudinally-oriented cross sectional end, the centrally located yoke having a first side wall and a second side wall extending axially from the first opposing longitudinally-oriented cross sectional end and an interior wall formed from the first opposing longitudinally-oriented cross sectional end of the central longitudinally-oriented pushout rod section between the first side wall and the second side wall; the first side wall and the second side wall having a first transverse pivot hole and a second transverse pivot hole disposed vertically off-center from the longitudinally-oriented central cross sectional axis; the first transverse pivot hole and the second transverse pivot hole transversely aligned to each other; and
    a male pushout rod end section formed at a second opposing longitudinally-oriented cross sectional end of the central longitudinally-oriented pushout rod section, the male pushout rod end section comprising a centrally disposed vertical tab extending axially from the second opposing longitudinally-oriented cross sectional end, the centrally disposed vertical tab having a third transverse pivot hole disposed vertically off-center from the longitudinally-oriented central cross sectional axis so that when the centrally disposed vertical tab is inserted in between the first side wall and the second side wall of the centrally located yoke the third transverse pivot hole transversely aligns with the first transverse pivot hole and the second transverse pivot hole.

2. The electric induction heating line billet pushout rod of claim 1 further comprising a magnetic field disruptor formed from at least one longitudinally-oriented grooved region at least partially along the central longitudinally-oriented pushout rod section.

3. An electric induction heating line jointed billet pushout rod assembly comprising:
    a plurality of pushout rods serially and revolutely joined together, each one of the plurality of pushout rods comprising:
    a central longitudinally-oriented pushout rod section having a longitudinally-oriented central cross sectional axis;
    a female pushout rod end section formed at a first opposing longitudinally-oriented cross sectional end of the central longitudinally-oriented pushout rod section, the female pushout rod end section comprising a centrally located yoke extending axially from the first opposing longitudinally-oriented cross sectional end, the centrally located yoke having a first side wall and a second side wall extending axially from the first opposing longitudinally-oriented cross sectional end and an interior wall formed from the first opposing longitudinally-oriented cross sectional end of the central longitudinally-oriented pushout rod section between the first side wall and the second side wall; the first side wall and the second side wall having a first transverse pivot hole and a second transverse pivot hole disposed vertically off-center from the longitudinally-oriented central cross sectional axis; the first transverse pivot hole and the second transverse pivot hole transversely aligned to each other; and
    a male pushout rod end section formed at a second opposing longitudinally-oriented cross sectional end of the central longitudinally-oriented pushout rod section, the male pushout rod end section comprising a centrally disposed vertical tab extending axially from the second opposing longitudinally-oriented cross sectional end, the centrally disposed vertical tab having a third transverse pivot hole disposed vertically off-center from the longitudinally-oriented central cross sectional axis, so that when the centrally disposed vertical tab is inserted in between the first side wall and the second side wall of the centrally located yoke the third transverse pivot hole transversely aligns with the first transverse pivot hole and the second transverse pivot hole; and
    a pivot joint securing element transversely passing through the first, second and third transverse pivot holes of adjacent pushout rods of the plurality of pushout rods to form a revolute joint with a rotation limit.

4. The electric induction heating line jointed billet pushout rod assembly of claim 3 wherein the pivot joint securing element comprises a clevis pin secured at an opposing ends of the clevis pin to retain the clevis pin passing through the first, second and third transverse pivot holes.

5. The electric induction heating line jointed billet pushout rod assembly of claim 3 further comprising a nose adaptor revolutely connected to a head pushout rod of the plurality of pushout rods.

6. The electric induction heating line jointed billet pushout rod assembly of claim 3 wherein at least one of the plurality of pushout rods further comprises a magnetic field disruptor formed from at least one longitudinally-oriented grooved region at least partially along the central longitudinally-oriented pushout rod section.

7. The electric induction heating line jointed billet pushout rod assembly of claim 3 wherein a length of the central longitudinally-oriented pushout rod section of each of the plurality of pushout rods is equal.

8. An electric induction heating line billet pushout system comprising:

an electric induction heating line jointed billet pushout rod assembly comprising:
  a plurality of pushout rods serially and revolutely joined together, each one of the plurality of pushout rods comprising:
    a central longitudinally-oriented pushout rod section having a longitudinally-oriented central cross sectional axis;
    a female pushout rod end section formed at a first opposing longitudinally-oriented cross sectional end of the central longitudinally-oriented pushout rod section, the female pushout rod end section comprising a centrally located yoke extending axially from the first opposing longitudinally-oriented cross sectional end, the centrally located yoke having a first side wall and a second side wall extending axially from the first opposing longitudinally-oriented cross sectional end and an interior wall formed from the first opposing longitudinally-oriented cross sectional end of the central longitudinally-oriented pushout rod section between the first side wall and the second side wall; the first side wall and the second side wall having a first transverse pivot hole and a second transverse pivot hole disposed vertically off-center from the longitudinally-oriented central cross sectional axis; the first transverse pivot hole and the second transverse pivot hole transversely aligned to each other; and
    a male pushout rod end section formed at a second opposing longitudinally-oriented cross sectional end of the central longitudinally-oriented pushout rod section, the male pushout rod end section comprising a centrally disposed vertical tab extending axially from the second opposing longitudinally-oriented cross sectional end, the centrally disposed vertical tab having a third transverse pivot hole disposed vertically off-center from the longitudinally-oriented central cross sectional axis, so that when the centrally disposed vertical tab is inserted in between the first side wall and the second side wall of the centrally located yoke the third transverse pivot hole transversely aligns with the first transverse pivot hole and the second transverse pivot hole; and
    a pivot joint securing element transversely passing through the first, second and third transverse pivot holes of adjacent pushout rods of the plurality of pushout rods to form a revolute joint with a rotation limit;
  a pushout rod assembly storage enclosure comprising a linear storage section and an arcuate storage section for a ready-for-use storage of the electric induction heating line jointed billet pushout rod assembly, the arcuate storage section connected at a first end of the linear storage section and configured to reverse a direction of the electric induction heating line jointed billet pushout rod assembly moving through a mouth end of the arcuate storage section disposed adjacent to an electric induction heating line, a head pushout rod of the electric induction heating line jointed billet pushout rod assembly positioned at the mouth end of the arcuate storage section and a tail pushout rod of the electric induction heating line jointed billet pushout rod assembly positioned at a second end of the linear storage section opposite the first end; and
  a pushout rod assembly driver system engaging the electric induction heating line jointed billet pushout rod assembly to alternatively deploy the electric induction heating line jointed billet pushout rod assembly from the pushout rod assembly storage enclosure to the electric induction heating line and extract the electric induction heating line.

9. The electric induction heating line billet pushout system of claim 8 wherein the pushout rod assembly driver system comprises a pair of pinch rolls selectively engaging and disengaging the electric induction heating line jointed billet pushout rod assembly in the pushout rod assembly storage enclosure.

10. The electric induction heating line billet pushout system of claim 8 wherein at least one of the plurality of pushout rods further comprises a magnetic field disruptor formed from at least one longitudinally-oriented grooved region at least partially along the central longitudinally-oriented pushout rod section.

11. The electric induction heating line billet pushout system of claim 8 wherein the pivot joint securing element comprises a clevis pin secured at an opposing ends of the clevis pin to retain the clevis pin passing through the first, second and third transverse pivot holes.

12. The electric induction heating line billet pushout system of claim 8 further comprising a nose adaptor revolutely connected to the head pushout rod.

13. An The electric induction heating line billet pushout system of claim 8 wherein at least one of the plurality of pushout rods further comprises a magnetic field disruptor formed from at least one longitudinally-oriented grooved region at least partially along the central longitudinally-oriented pushout rod section.

14. A method of pushing out heated billets from an electric induction heating line, the method comprising:
  loading a batch of billets for electric induction heating in the electric induction heating line, the batch of billets terminating in a final batch billet;
  deploying an electric induction heating line jointed billet pushout rod assembly in a "ready to use" position from an arcuate storage section of a pushout rod assembly storage with a pushout rod assembly driver system, the electric induction heating line jointed billet pushout rod assembly comprising:
    a plurality of pushout rods serially and revolutely joined together, each one of the plurality of pushout rods comprising:
      a central longitudinally-oriented pushout rod section having a longitudinally-oriented central cross sectional axis;
      a female pushout rod end section formed at a first opposing longitudinally-oriented cross sectional end of the central longitudinally-oriented pushout rod section, the female pushout rod end section comprising a centrally located yoke extending axially from the first opposing longitudinally-oriented cross sectional end, the centrally located yoke having a first side wall and a second side wall extending axially from the first opposing longitudinally-oriented cross sectional end and an interior wall formed from the first opposing longitudinally-oriented cross sectional end of the central longitudinally-oriented pushout rod section between the first side wall and the second side wall; the first side wall and the second side wall having a first transverse pivot hole and a second transverse pivot hole disposed vertically off-center from the longitudinally-oriented central cross sectional axis; the first transverse pivot hole and the second transverse pivot hole transversely aligned to each other; and a male pushout rod end section formed at a second opposing longitudinally-oriented cross sectional end of the central longitudinally-oriented pushout rod section, the male pushout rod end section comprising a centrally disposed vertical tab extending axially from the second opposing longitudinally-oriented cross sectional end, the centrally disposed vertical tab having a third transverse pivot hole disposed vertically off-center from the longitudinally-oriented central cross sectional axis, so that when the centrally disposed vertical tab is inserted in between the first side wall and the second side wall of the centrally located yoke the third transverse pivot hole transversely aligns with the first transverse pivot hole and the second transverse pivot hole;

a pivot joint securing element transversely passing through the first, second and third transverse pivot holes of adjacent pushout rods of the plurality of pushout rods to form a revolute joint with a rotation limit; and adjusting a deployment speed and torque of the pushout rod assembly driver system with a billet pushout system controller responsive to a speed and torque of an induction heating line driver as a head pushout rod or a head adopter makes contact with the final batch billet and the electric induction heating line jointed billet pushout rod assembly deploys behind the final batch billet until the final batch billet exits the electric induction heating line; and retracting the electric induction heating line jointed billet pushout rod assembly into the arcuate storage section of the pushout rod assembly storage to the "ready-to-use" position with the pushout rod assembly driver system.

\* \* \* \* \*